Figure 1:
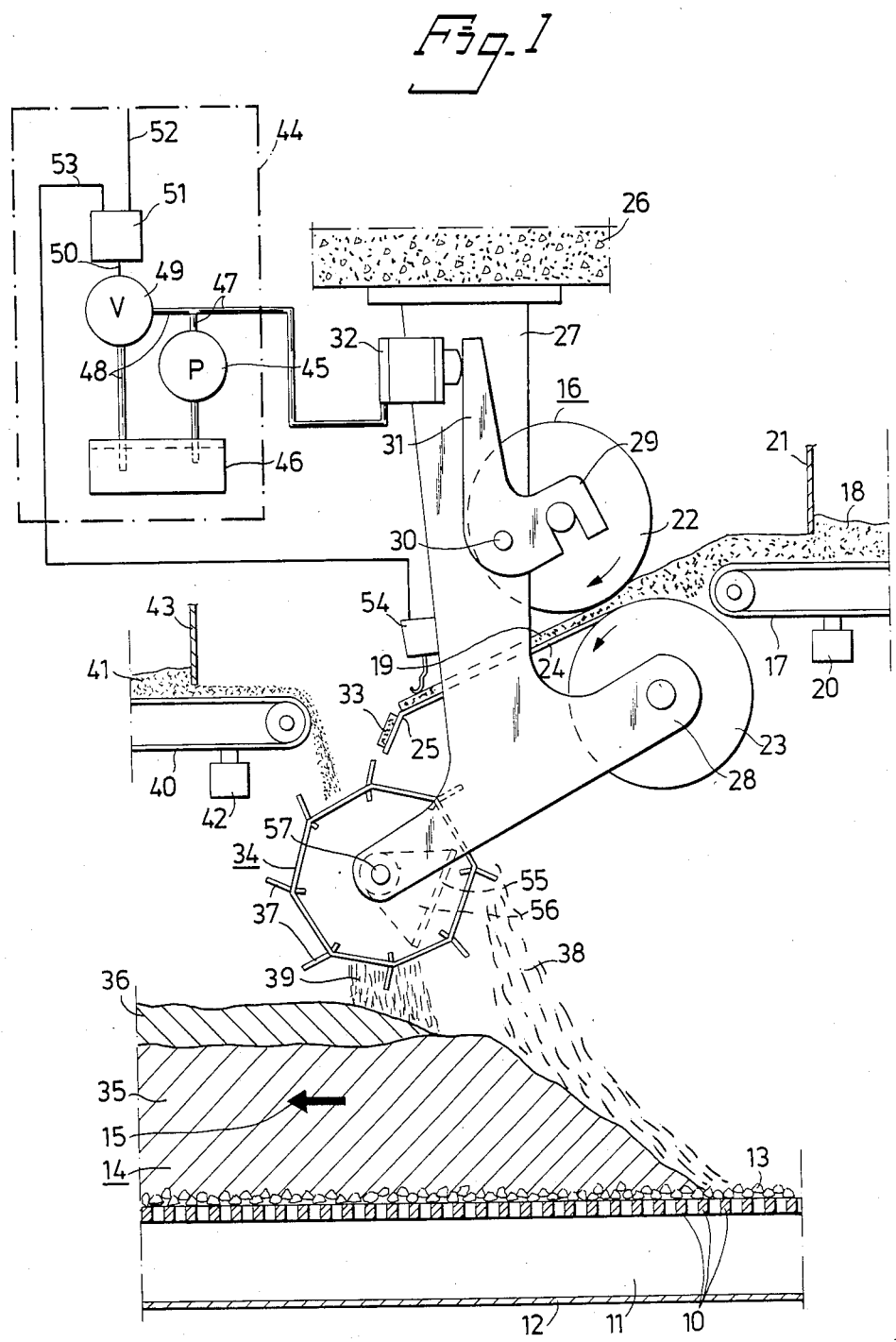

United States Patent [19]

Bostrom et al.

[11] Patent Number: 4,648,900

[45] Date of Patent: Mar. 10, 1987

[54] SUCTION SINTERING METHOD AND APPARATUS THEREFOR

[76] Inventors: Olle Bostrom, Slottsvagen 83, S-183 52 Taby; Karl Gorling, Kullavagen 23, S-181 62 Lidingo, both of Sweden

[21] Appl. No.: 639,621

[22] PCT Filed: Dec. 4, 1981

[86] PCT No.: PCT/SE81/00354

§ 371 Date: Aug. 4, 1982

§ 102(e) Date: Aug. 4, 1982

[87] PCT Pub. No.: WO82/02062

PCT Pub. Date: Jun. 24, 1982

Related U.S. Application Data

[63] Continuation of Ser. No. 406,235, Aug. 4, 1982, abandoned.

[30] Foreign Application Priority Data

Dec. 8, 1980 [SE] Sweden .................................. 8008613

[51] Int. Cl.[4] .............................................. C22B 1/00
[52] U.S. Cl. ................................................ 75/3; 75/5
[58] Field of Search .......................... 75/3, 5, 33, 36; 419/38, 39

[56] References Cited

U.S. PATENT DOCUMENTS

| | | | |
|---|---|---|---|
| 3,353,953 | 11/1967 | Schwarz | 75/5 |
| 3,432,287 | 3/1969 | Greaves et al. | 75/5 |
| 3,837,843 | 9/1974 | Pons et al. | 75/3 |
| 3,986,864 | 10/1976 | Hofmann | 75/3 |
| 4,084,957 | 4/1978 | Ernst | 75/3 |
| 4,199,348 | 4/1980 | Ground | 75/3 |
| 4,199,349 | 4/1980 | Wood et al. | 75/25 |
| 4,317,676 | 3/1982 | Souma et al. | 75/5 |

FOREIGN PATENT DOCUMENTS 744049  6/1980  U.S.S.R. ................................. 75/5

OTHER PUBLICATIONS

Ball et al., *Agglomeration of Iron Ores* (1973), pp. 259–265, Amer. Elseirs Publ. Comp., N.Y.

*Primary Examiner*—Allan M. Lieberman
*Attorney, Agent, or Firm*—Fleit, Jacobson, Cohn & Price

[57] ABSTRACT

A suction-sintering charge of high permeability and stable structure is produced on a mobile suction-sintering grate or in a stationary or mobile suction-sintering pan by form compacting a moist material mixture (18) to be sintered to form a coherent cake (19), held together mainly by capillary forces, which cake is then broken into pieces having a size suitable to form a suction-sinter charge. The water content of the material mixture (18) is adjusted so that substantially the minimum of fuel is consumed at the intended sintering temperature and the compaction pressure is so adapted relative to the selected water content, corresponding substantially to the minimum fuel consumption, that the pore volume of the resultant cake is not totally filled by the amount of water present in said mixture.

6 Claims, 3 Drawing Figures

SUCTION SINTERING METHOD AND APPARATUS THEREFOR

This application is a continuation of application Ser. No. 406,235, filed Aug. 4, 1982 which was abandoned on Aug. 10, 1984.

The present invention relates to a method for producing a charge of high permeability and stable structure on a mobile suction-sintering grate or in a stationary or mobile suction-sintering pan, comprising the steps of compacting a moist material mixture to be sintered, preferably between at least one pair of pressure-loaded rolls, to form a coherent cake, the particles forming said cake being held together mainly by capillary forces, and breaking the cake into pieces of a size suitable for forming a suction-sinter charge. The invention also relates to apparatus for carrying out the method.

Suction sintering is primarily applied to the purpose of agglomerating finely divided iron-oxide material into a form suitable for charging to a blast furnace, and represents a substantial cost in the manufacture of crude iron. Consequently, it is important that as much sinter as possible is produced per each unit of grate area, in order to reduce investment, maintenance, fuel and electrical-energy costs.

With regard to sintering capacity, the most important factor is the permeability of the charge. The more gas drawn through the charge per unit of time, the less time required to effect a satisfactory sintering operation. The permeability of the charge can be increased in a number of ways. The most usual method in this respect is to increase the amount of coarse particulate return-sinter admixed with the charge. Large quantities of coarse return-sinter, however, increase the amount of fuel required per unit of weight of final sinter, and incur additional handling costs. Furthermore, in certain instances it is necessary to crush the final sinter, in order to obtain the requisite amount of return-sinter. Another method often used is one in which the charge mixture is subjected to a subsequent rolling process in a drum. Although the permeability of the charge is increased to a certain extent by this method, it is necessary to control accurately the amount of moisture present, and normally the amount of water needed is more than is justified by the thermal progress of the sintering operation at the desired low level of fuel consumption. Neither does rolling a mixed charge in a drum produce a stable charge. Instead, the charge produced tends to become compacted when subjected to the high underpressure desirable in suction sintering operations in respect of high plant capacity, when sintering fine, particulate material.

In a number of cases attempts have been made to increase the permeability of the charge by micro-pelletizing one or more of the iron-oxide products making up the charge. However, this technique requires the provision of additional and expensive pelletizing apparatus, such as drum or pan pelletizers. Only extremely fine-grain material can be micro-pelletized, and normally it is necessary to use a binder, together with an accurately controlled addition of water, which may result in bogging in the lower regions of the charge during the sintering process, i.e. the mutual adhesion of respective particles in the bottom region. Another drawback is that the charge constituents are not mixed together with a thoroughness sufficient to favour desired formation of slag during the sintering and blast-furnace operations.

In many parts of the world, iron-oxide is highly enriched in order firstly to increase the iron content and secondly to remove contaminents, such as phosphorus. In such working-up processes, prior to being enriched the ore must be ground down to such a small particle size as to render the resultant fine concentrate unsuitable for suction sintering. Examples of such concentrates include the Mid-Swedish and Northern-Swedish concentrates which have been purified of phosphorous and which are thus very fine. In order to find a market for such materials, it has been elected to sinter them to pellet form. Sintered pellets, however, are not ideal agglomerates for treatment in blast furnaces, neither with respect to shape nor chemical composition, and in many instances the sinter obtained from suction-sintering processes is preferred, not least because it can be made self-fluxing, i.e. the sinter can be made to include constituents necessary for the blast furnace.

In addition to fine particulate ore concentrates, there are many fine particulate iron-containing materials which cannot, at present, be agglomerated by suction sintering techniques. Examples of such concentrates include pyrite cinders, dust from oxygen-blowing processes, and other very fine metallurgical intermediate products.

One attempt to find a solution with regard to a fine-particulate sinter charge is illustrated in Swedish Patent Specification No. 212 742, according to which a moist chargemixture is subjected to high-frequency vibrations, to form a coherent cake which is placed in the form of small pieces on a sinter grate and sintered. The aforementioned pieces are passed through a screen and classified in a manner so that the coarser fraction of the charge lies nearest the grate and the finer fraction lies on top of said coarser fraction. Difficulties were encountered, however, when trying to put this method into practice. A relatively high moisture content was required in order to obtain a plasticity suitable to form a cake. When the particulate material was vibrated, the surfaces of the cake became moist, which resulted in adhesion to the surface supporting said cake. In addition, it was difficult to achieve high-frequency vibration of sufficient penetration depth.

An object of the present invention is to provide a novel and advantageous method for producing a highly permeable suction-sinter charge of stable structure, by which the disadvantages discussed above can be at least substantially overcome.

To this end there is provided a method of the kind stated in the introduction, which is further characterized by adjusting the water content of the material mixture to a level at which substantially the minimum of fuel is consumed at the sintering temperature intended; and by so adjusting the compaction pressure in relation to the set water content, corresponding substantially to the minimum fuel consumption, so that the pore volume of the resultant cake is not totally filled by the water present in said mixture. In this way, the aforementioned disadvantages are overcome in a simple manner. In suction-sintering a material bed formed in accordance with the invention, there is formed, when the bed is ignited at the upper surface thereof a combustion layer which is thin relative to the thickness of the bed and which moves downwardly through the entire bed while air is drawn by suction through said bed. Air which has been heated by cooling the already heated overlying part of the bed is charged to said layer, while gas from the combustion layer dries and heats the nearest underlying bed layer. In this respect, the water content is of great significance to the course taken by the sintering operation, since with the amount of air charged per unit of time constant, the water content determines the speed at which the front of the combustion layer moves down through the bed. On the other hand, the speed of the cooling layer following the combustion layer, and in which cooling layer the sintered charge material is cooled by the incoming air, is determined by the highest temperature reached in the bed and the amount of air drawn therethrough, the speed of said combustion layer being constant when a constant amount of air is supplied and with a constant highest temperature. The combustion layer and the cooling layer, however, will only move at mutually the same speed when the water content is that utilized in the method according to the invention, whereat, as before mentioned, there is obtained a desired thin combustion layer, which affords substantially minimum fuel consumption at desired sintering temperature. If the water content is reduced, the speed at which the combustion layer moves will increase but not the speed of the cooling layer, whereat the fronts of the two layers will move apart and there will be obtained a thick combustion layer, requiring more fuel to be added in order to reach the desired combustion temperature. The reason why, in this case, a reduced water content results in an increased fuel consumption is that the sinter contains more residual heat when the combustion layer reaches the grate. If the water content is, instead, increased above the value at which the combustion and cooling layers move at the same speed, the speed at which the front of the combustion layer moves will decrease. The speed at which the cooling layer moves, however, is unchanged. Because of this, the sintering temperature will gradually fall, and may even fall to a level at which the charge will be extinguished, and hence the higher water content must be compensated for by increasing the amount of fuel supplied. Thus, at every given sintering temperature there is a determinable water content, which is adjusted in the method according to the invention so as to obtain the lowest possible fuel consumption. The cake formed by compacting the material in accordance with the invention may not, however, contain free moisture on the surfaces thereof, since otherwise the cake pieces become sticky and bake together in the charge placed on the grate, and when producing the cake by rolling, cause the rolls to slip against the cake, and a mechanically weak cake is obtained. If the pores of the formed cake are unable to accommodate the amount of water necessary to provide for the lowest possible fuel consumption, so that surface water occurs when pressing the material to cake form, it would seem an obvious thing to decrease the amount of water. This would mean that more fuel must be charged, however. Thus, it has been found in accordance with the invention necessary to adjust the pore volume of the cake by regulating the compaction pressure such that the cake is able to accommodate the requisite amount of water. The extent to which the pores are filled, however, must not be extensively low, since, to a large extent, it is capillary forces which hold the cake together. In this respect, it has been found that the pores of the pressed cake should be filled to at least 60%, preferably 60–90%.

In the conventional preparation of a sinter charge it has been found necessary, in many cases, to add more water than required from the thermal aspect, in order to obtain a permeable charge, which means that more fuel is consumed. This is not necessary when preparing a sinter charge in accordance with the method of the invention proposed here, which constitutes a highly important advantage.

If the pressed cake is too thick, there is a risk of the fuel, normally fine coke particles, being entrapped so as to delay the ignition of the fuel. Because of this, the cake thickness should not exceed 12 mm, and should not be smaller than 4 mm, since otherwise the cake will be too weak to enable it to be broken up in a predeterminable manner into pieces having a size suitable to form a suction-sinter charge. Furthermore, in order to obtain good gas distribution and heat transfer between gas and goods in the sinter charge, the compacted cake should be broken up into pieces having a largest dimension of at most 20 mm, preferably of at most 15 mm.

The resistance to suction of a mixture of two particle sizes is greater than the total suction resistance of the two particle classifications per se. Because of this it has been found to be of advantage when the compacted cake, subsequent to being broken up, is classified in a screening apparatus to form a relatively coarse particulate material fraction, which is placed nearest the grate, and a fine particulate material fraction, which is placed upon the coarse fraction. In this respect, it is to particular advantage when the classifying process is adapted so that the major part of the material, preferably about ⅔rds thereof, is present in the coarse material fraction lying nearest the grate. The fact that the upper layer of the charge comprises the finer particles, makes it easier to ignite the charge. This also improves the transfer of heat between goods and gas at that stage of the sintering process where stabilization of the front of the combustion layer is desirable. In addition, fuel can be saved by mixing fine, particulate additional fuel with the finer particulate fraction, since less fuel can then be used for the remainder of the charge.

As before mentioned, the invention also relates to an apparatus for producing on a mobile suction-sintering grate or in a stationary or mobile suction-sintering pan a highly permeable charge of stable structure, said apparatus comprising means for compacting a stream of moist material-mixture to be sintered, to form a coherent cake, which is then broken up into pieces of a size suitable to form a suction-sinter charge, said apparatus further including in accordance with the invention means for so adjusting the compaction pressure in relation to the water content of the material mixture that the pore volume of the cake formed is not completely filled by the water present in the material mixture. This arrangement enables the object of the invention to be realized with the use of means of simple construction.

Further characterizing features of the apparatus and advantages afforded thereby are disclosed in the following claims and illustrated hereinafter.

Figure 2:
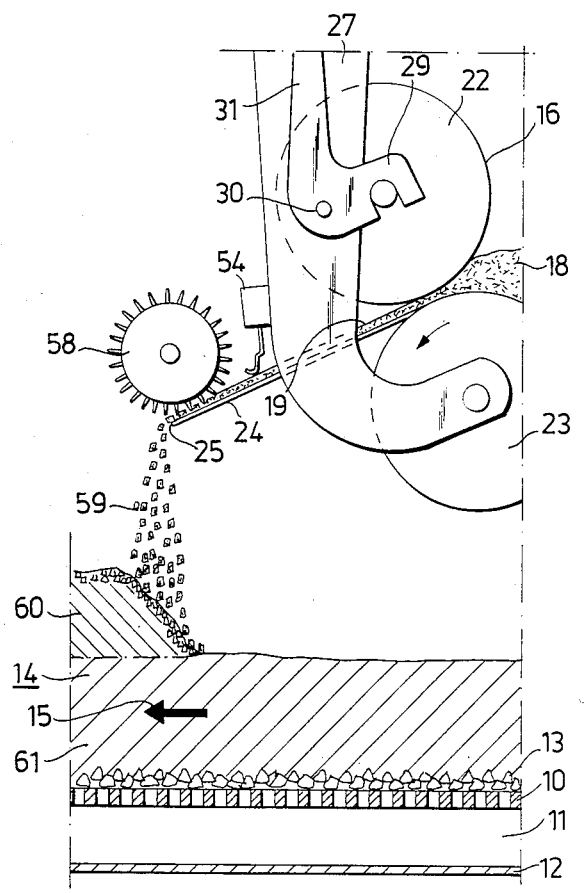
Figure 3:
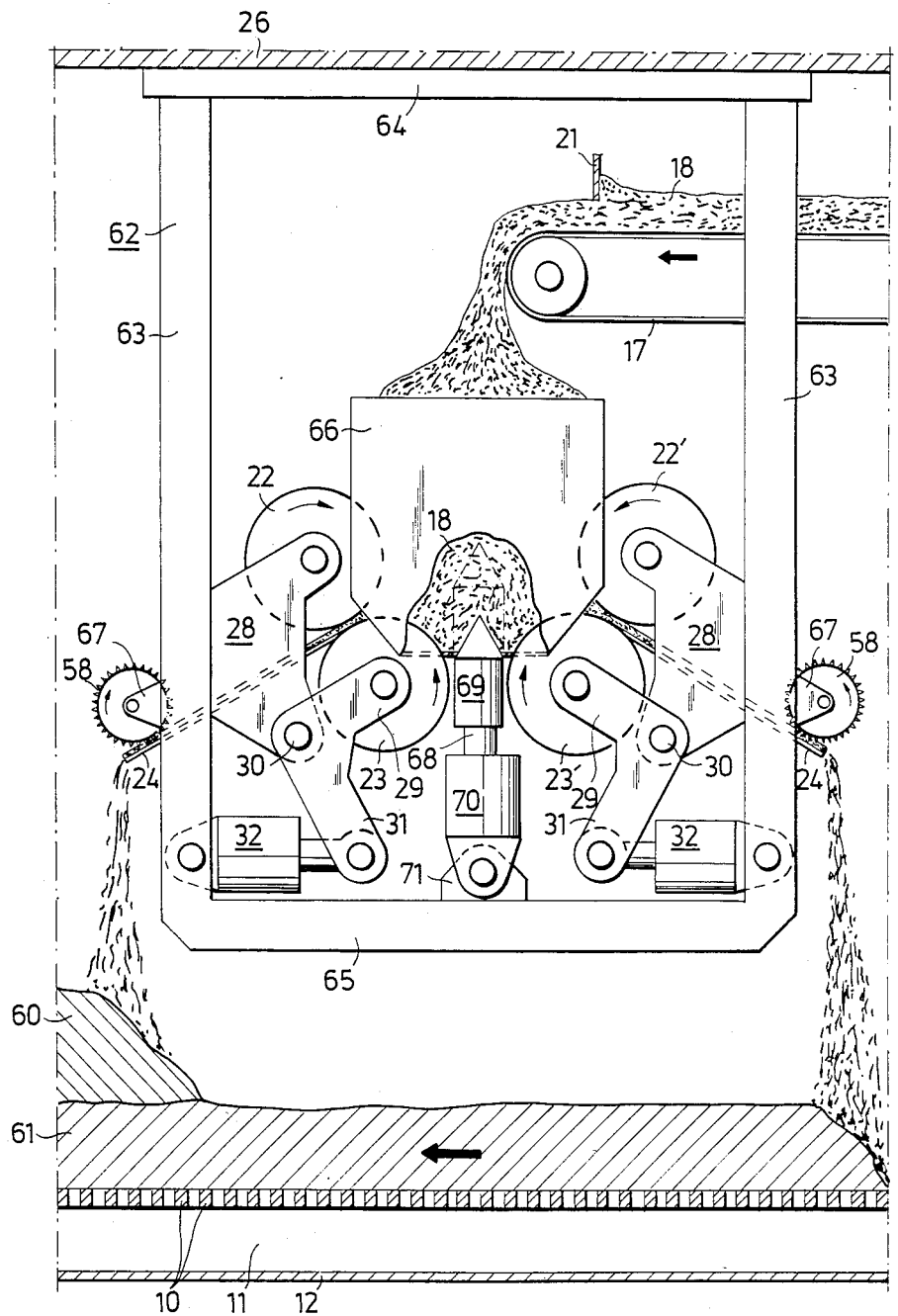

The invention will now be described in more detail with reference to the accompanying drawings, in which FIG. 1 illustrates schematically a first embodiment of the invention, FIG. 2 illustrates schematically a second embodiment of the invention, and FIG. 3 illustrates schematically a third embodiment of the invention, in which bed layers are formed, one upon the other, by means of roll pairs arranged back-to-back in one and the same frame structure.

In FIG. 1 the reference 10 identifies a mobile suction-sintering rate, which is only partially shown, the bottom of the underlying suction box 11 being shown at 12.

Located on the grate 10 is a hearth layer 13 which comprises a coarse particulate material and which is intended to prevent overheating of the grate 10 during a suction-sintering operation. It will be seen from the drawings that as the grate moves slowly forwards in the direction of arrow 15, there is gradually formed on the grate 10 a bed 14 of material to be suction-sintered.

Arranged above the grate are means for compacting a moist material mixture 18 arriving on a conveyor 17 to form a coherent cake 19, said means in the illustrated embodiment having the form of a rolling mill identified generally at 16. The moist material mixture may, for example, comprise a fine particulate iron-ore concentrate, fine particulate, iron-containing metallurgical intermediate products, coke dust and slag formers, whereat the fuel and water content are adjusted with respect to one another so that substantially the minimum of fuel is consumed at the requisite sintering temperature. The conveyor 17 is provided with a weighing device 20 and is driven at a speed such as to supply a constant amount of material to the rolling mill 16 per unit of time. The string of material passing to the rolling mill is smoothed out or levelled by means of a scraper device 21, so that said string or stream of material has a uniform thickness along that part of the rolls 22 and 23 of the rolling mill active in compacting the material.

Connecting to the outfeed side of the roll pair 22, 23 is a slide plate having a flat bottom 24, which forms a downwardly inclined support plate for receiving and guiding the cake 19 formed by the rolls 22, 23, to a location directly above the grate 10. As the cake 19 passes over the lower edge 25 of the plate 24, the cake is broken, by the action of gravity, into pieces having a size suitable to form a suction-sinter charge. The size of the pieces obtained can be varied by suitable adjustment between, inter alia, the amount of material mixture 18 supplied per unit of time and the roll pressure, which parameters determine the cake thickness and the mechanical strength of the cake, at least to a certain extent. The plate 24 may be arranged so as to enable it to be adjusted to different angles relative to the horizontal. The angle at which the plate is inclined to the horizontal, however, shall be small enough to ensure that the friction generated between the plate and the cake 19 will prevent the cake from being broken upon the plate by gravitational forces acting on said cake, before the cake reaches the edge 25, over which the cake is broken.

The rolls 22, 23 are driven synchronously by means of a respective motor (not shown) or a common motor, and are journalled in a rolling stand, which in the illustrated embodiment is supported by the ceiling of the building housing the suction-sintering plant, a part of said ceiling being shown at 26. Only one rolling stand, identified by reference 27, is illustrated in FIG. 1. The other rolling stand has substantially the same design. The lower roll 23 is journalled in a part 28 of each rolling stand, while each end of the other roll 22 is journalled in one arm 29 of a double-arm lever pivotally mounted at 30 in the associated rolling stand 27, the other arm of said lever being identified by reference 31. Acting against the other arm 31 is a hydraulic piston-cylinder device 32, which endeavours to swing the lever in a direction in which the roll 22 is urged towards the roll 23. A double-arm lever with associated piston-cylinder device is provided for each end of the roll 22. The levers may, to advantage, be rigidly connected together, so that they are swung synchronously. Further, the arrangement is such that the plane containing the axes of the rolls 22, 23 is substantially perpendicular to the plate 24, so that the cake 19 is supported by the plate 24 immediately it leaves the roll pair 22, 23, thereby eliminating the risk of unintentional, premature disintegration of the cake.

A guide plate 33 which slopes downwardly from the plate 24 connects with the lower edge 25 of the plate 24, over which edge 25 the cake 19 is caused to disintegrate, said plate 33 being arranged to guide the cake pieces to a screening apparatus 34, where they are divided into a relatively coarse particulate fraction, which is placed nearest the grate 10 on top of the hearth layer 13 to form a lower layer 35 of the charge bed 14, and a relatively fine particulate fraction, which is placed on top of the layer 35, to form an upper layer 36 of the bed 14. In this way, screening of the cake pieces is adapted so that the layer 35 will contain approximately ⅔rds or more of the total amount of material in the bed.

In the illustrated embodiment, the screening apparatus 34 has the form of a drum comprising an outer casing of polygonal cross-sectional shape provided with screen openings. Extending along the whole of the length of the drum are outwardly projecting, substantially radial blades 37. The screening openings may comprise slots which pass through the drum casing and extend peripherally thereof between mutually adjacent blades 37. The width of the slots may, to advantage, be in the order of 10 mm. The drum is rotated clockwise by means of a motor (not shown), whereat coarse cake-pieces falling onto the drum from the guide plate 33 will not pass through the screening openings, but will be moved to the right, as seen in FIG. 1, by the blades 37 and fall down onto the grate 10, as indicated at 38, to form the bed layer 35. The smaller cakepieces will enter the drum through the screening openings and pass straight through said drum, to form a stream 39 of relatively fine particulate material, said finer pieces being charged to the layer 35 already formed on the grate, to form the upper charge layer 36. As illustrated in FIG. 1, desirable, fine additives, such as fine, particulate additional fuel, can be homogeneously mixed into the upper layer 36. To this end there is provided a conveyor 40 on which the fine particulate additive material 41 is conveyed to the screening apparatus 34, through which said additive material is caused to pass whilst being admixed with the finer fraction of the material arriving from the guide plate 33. As shown at 42, the conveyor 40 is arranged to co-act with a weighing device, to enable correct metering of the additive material to the drum, and with a scraper device 43 for levelling out the stream of additive material passing to the screening apparatus 34, so that said stream of additive material is of uniform thickness over the whole of its width.

For the purpose of obtaining, by rolling, a cake 19 having the correct properties there is provided a control means, generally referenced 44, by means of which the roll pressure can be automatically adjusted and monitored so that the cake 19 obtains the correct porosity relative to the amount of moisture present in the mixture 18, preferably so that the pores of the cake 19 are filled with water to a given percentage within the range of 60–90% by volume, within which range the cake obtains the desired mechanical strength. The control means includes a pump 45, the suction side of which is connected to a hydraulic liquid sump 46 and the pressure side of which is connected to each hydraulic piston cylinder device 32, via a line 47. A return line 48 extends from the line 47 back to the sump 46, there being arranged in the return line 48 a regulatable throttle valve 49, the degree to which the valve 49 is throttled determining the pressure exerted by each piston-cylinder device 32 on the arm 31, and therewith the roll pressure. The valve 49 is controlled from a known comparison circuit 51, via a control line 50, said circuit being arranged to receive on an input line 52 a signal which corresponds to a selected set-point value of the thickness of the cake 19. The comparison circuit 51 receives, via a line 53, an input signal sent by a transducer 54 arranged to sense the thickness of the cake 19, said input signal corresponding to the instantaneous cake thickness, whereat the comparison circuit 51 compares the signals from the lines 52 and 53 and when the signal obtained on line 53 deviates from the value corresponding to the setpoint value of the thickness of said cake 19, adjusts the output signal on the line 50 so as to increase or decrease the throttling effect exerted by the valve, thereby to change the roll pressure to a magnitude at which the desired cake thickness will be obtained.

As will be understood, the screening apparatus 34 and the conveyor 40 can be omitted from the apparatus illustrated in FIG. 1 when classification of the pieces obtained when disintegrating the cake 19, and the supply of additive material 41 is unnecessary. Further, it is, of course, possible to control the manufacturing process of the sinter charge in a different way to that illustrated and described. It will also be understood that the sintering grate 10 may be stationary and the apparatus producing the sinter charge arranged from movement along the grate.

In order to improve the accuracy at which the material fraction 39 of finer particle size is placed on the grate when fractioning the material by means of the screening apparatus 34, there is arranged inside the screening drum a guide plate 55 which is journalled on the shaft 57 of the screening drum via end pieces 56, and the angle of inclination of which guide plate can be adjusted by rotation about said shaft 57.

Coinciding or substantially coinciding elements in FIGS. 1, 2 and 3 are identified with the same reference numerals and will not be described in detail in the following description of FIGS. 2 and 3, which illustrate a first and a second modification of the apparatus shown in FIG. 1.

In the FIG. 2 embodiment there is arranged above the support plate 24 adjacent the lower end thereof a driveable spiked roller 58, which is preferably a variable-speed roller and which is intended to form fractural impressions in the cake 19 or to completely disintegrate the cake, the size of the cake pieces being determined by the distance between the spikes and the peripheral speed of the roller. For the sake of clarity, the motor driving the spiked roller 58 and the means supporting said roller have not been shown in FIG. 2. The cake pieces obtained fall from the lower edge of the plate 24 in a stream 59, which forms an upper layer 60 of the bed 14 on top of a bed layer 61 previously placed on the grate 10 and the hearth layer 13. The bed layer 61 may be formed with the aid of a further roll pair (not shown) located to the right, as seen in FIG. 2, of the illustrated roll pair, and the material of the layer 61 may have a different composition or a different mean particle size to the material of the layer 60.

As will be understood from the aforegoing, when practicing the invention according to the embodiment illustrated in and described with reference to FIG. 2, two separate roll pairs 22, 23 and ancillary equipment, arranged at some distance apart, are required to build the bed layers 60, 61 on the grate 10. While such an arrangement may be perfectly adequate, it requires a relatively large amount of space and equipment. FIG. 3 illustrates an embodiment of the invention where the space required has been cut down by combining the two pairs of rolls in a common, compact unit.

Thus, FIG. 13 illustrates a mobile suction-sintering grate 10, on which the bed layers 60, 61 are formed by means of the two roll pairs 22, 23, and 22', 23' arranged in one and the same open-frame structure 62, thereby obviating the need to provide two mutually spaced, separate layer-forming stations and reducing the amount of space required. As shown in the Figure, the open-frame structure comprises mutually spaced vertical members 63, top horizontal members 64 attached to ceiling 26 and bottom horizontal members 65, only one such top and bottom horizontal member being shown.

In the FIG. 3 embodiment, the roll pairs 22, 23 and 22', 23' are arranged back-to-back, so that the infeed sides of respective roll pairs face one another. As will be seen from FIG. 3, the infeed sides of respective roll pairs lie in a common storage vessel 66, into which material to be sintered is poured from a single conveyor 17. As with the previously described embodiments, the conveyor 17 is arranged to co-act with a doctor on scraper means-21, for smoothing the material 18 conveyed by the conveyor 17. Connecting with the outfeed side of respective roll pairs 22, 23 and 22', 23' is a support plate 24, which is inclined at an angle at which, while allowing a cake string to be moved down the plate 24 by the forces exerted thereon by the part of the cake issuing from the roll nip is not sufficiently large to cause the cake to slide down the plate under the influence of gravity at a speed liable to cause premature disintegration of the cake.

As shown in FIG. 3, each of the slide plates 24 has arranged in the vicinity of the end thereof remote from respective roll pairs a spiked roll 58 mounted for rotation on a bracket 67 carried by a respective vertical member 63. Similar to the FIG. 2 embodiment, the spiked rolls 58 are intended to break the coherent cakes on plates 24 into pieces of given size, said size being dependent on the spacing of the spikes on said rolls and on the peripheral speed thereof.

The roll pairs 22, 23 and 22', 23' of the FIG. 3 embodiment are arranged in a manner resembling the mounting of the roll pairs 22, 23 of the FIG. 1 and FIG. 2 embodiments. Thus, the upper roll 22 or 22' of the roll stand shown to the left of the Figure is journalled for rotation in a fixed stand part 28, while the lower roll 23 or 23' of said roll pair is journalled on one arm 29 of a rotatable double-arm lever journalled at 30 to the fixed stand part 28. The other arm 31 of respective double-arm levers is pivotally attached to the piston of a piston-cylinder device 32, which endeavours to swing the lever in a direction in which the rolls 23, 23' are urged towards the rolls 22, 22'. As with the roll pair of the embodiments previously described, the arrangement is such that the planes containing the axes of the rolls 22, 23 and 22', 23' are substantially perpendicular to respective slide plates 24.

Although not shown in FIG. 3 each of the roll pairs is governed by a control means 44 similar to that described with reference to FIG. 1.

In order to ensure that the particulate material 18 in the vessel 66 is sufficiently friable to enable it to be picked up by the rolls of each roll pair, there is provided means for agitating the heap of material contained by the vessel 66, either constantly or at given periods. In the illustrated embodiment, the agitating means comprises at least one piston-cylinder device having on the distal end of the piston rod 68 of said device a bar 69 which is parallel with the roll axes and is arranged to be moved into and out of the heap of material 18 contained by the vessel 66. The bar 69 is provided with surfaces of such shape and size as to ensure that the material is stirred as the bar enters and leaves said heap, thereby to prevent bogging and to ensure a friable mass. As shown in the Figure, the cylinder 70 of the piston-cylinder device is secured to the frame structure 62 via a bracket 71. In operation, material 18 is fed to the vessel 66 by means of the conveyor 71, and is kept in a friable state in said vessel by means of the reciprocatingly movable bar 69. The material 18 is then picked up by the roll pairs 22, 23, and 22', 23' and compacted therebetween to form a coherent cake having the porosity desired, said porosity being controlled by said control means, as with the FIG. 1 embodiment. Each cake is moved down its respective support plate 24 to a spiked roll 58, which disintegrates the cake into pieces of given size. The pieces then fall onto the grate 10, forming either the layer 60 or the layer 61, depending on the position of the plate 24 from which said pieces fall, relative to the movement path of the grate 10, as clearly shown in the Figure. In order to provide a bed layer 61 of comparatively coarse material, the spikes of the spiked roll 58 associated with rolls 22', 23' may have a wider spacing than the spikes of the other roll 58.

As will be understood, further modifications of the apparatus according to the invention are possible within the scope of the invention. Thus, the pair or pairs of rolls may be arranged obliquely to the longitudinal direction of the grate or the rolling equipment may be separate from the suction-sintering grate, whereat the finished sinter-charge material is delivered to the grate by means of suitable conveying means, optionally via a charging or storage bunker.

The favourable effects which can be obtained by means of the invention will be evident from the following examples, in which all contents are given in percent by weight.

EXAMPLE 1

A material mixture comprising about 60% Grängesberg concentrate GAC (fine particulate concentrate having a high iron content and a specific surface area of 550 cm$^2$/g), about 32% of another concentrate having a lower iron content, and about 8% slag former, of which 4% was burnt lime, was admixed with 5% coke dust, 8% limestone and about 25% return sinter having a particle size beneath 6 mm, to form a suction-sinter charge mixture. This mixture, which was composed to provide a highly basic sinter, was moistened to a water content of 7%. The moist mixture was rolled to form a cake whose pores were filled with water to about 85% by volume and which was then disintegrated and screened in the manner described with reference to FIG. 1 and illustrated in said Figure, there being used rolls having a diameter of 350 mm and a roll pressure of about 400 kp per cm of effective roll length. The screening slots in the screening drum had a width of 10 mm, whereat about 30% of the material passed through the screening drum to form the finer upper layer of the charge bed, the height of which reached to about 320 mm above the hearth layer, which was 20 mm high. Sintering was effected with an underpressure of 1500 mm water column. The sintering time was about 10 minutes (including a standard addition of 2 minutes), there being obtained a production of about 42.5 tons per m$^2$ grate area and 24 hours. When subjected to a tumbler test, the resultant sinter, which was hard-burnt, had a value of about 60%. The aforegoing represents the result of a number of sintering tests subsequent to obtaining the stated approximate 25% balance between input and output return sinter. (For the tumbler test there was used a tumbler drum having a length of 900 mm and a diameter of 990 mm. The charge comprised 20 kg sintered material having a particle size of 20–40 mm, and the drum was rotated 200 revolutions during 8 minutes. Percentage by weight of tumbled material having a particle size exceeding 6 mm was measured.)

A charge of the same composition but prepared in a conventional manner, without rolling, gave with all other sintering conditions equal a production of about 33 tons per m$^2$ grate area and 24 hours, i.e. a production which was almost 30% lower than the production obtained when practicing the method according to the invention.

EXAMPLE 2

A material mixture comprising about 60% Grängesberg concentrate GPC (pellet-sinter concentrate having a high iron content and a specific surface area of 1600 cm$^2$/g), about 32% of another concentrate having a lower iron content and about 8% slag former, of which 4% was burnt lime, was admixed, for the purpose of forming a suction-sinter charge mixture, with 4% coke dust, 8% limestone and about 22% return sinter (<6 mm). This mixture was moistened to a water content of 7% and was rolled in accordance with Example 1 above to form a cake, the pores of which were filled with water to about 80% by volume, whereafter the cake was disintegrated by means of a spiked roller in accordance with FIG. 2 and layed on a sinter grate, without being screened, to form a bed having a height of about 350 mm over the hearth layer which was 20 mm high.

Subsequent to being dried, a sample of the material disintegrated by means of the spiked roller had the following particle size distribution:

| Particle size (mm) | Percentage (%) |
|---|---|
| >8 | 12.2 |
| 8–6 | 26.2 |
| 6–4 | 16.5 |
| 4–2 | 16.3 |
| 2–1 | 11.9 |
| 1–0,2 | 10.8 |
| <0.2 | 6.1 |

The sintering operation was carried out in complete accordance with Example 1 above, and required a time of 13 minutes (inclusive of the aforementioned two standard additional minutes) to carry out, there being obtained, subsequent to reaching the return balance of about 22%, a production of about 42 tons per m$^2$ grate area and 24 hours. A tumbler test as specified in Example 1 gave a result of about 65%.

It will be understood that such a fine concentrate as Grängesberg GPC could only be incorporated in extremely small quantities, when preparing suction-sinter charges in a conventional manner.

EXAMPLE 3

A material mixture comprising about 60% Malmberget concentrate MPC 3 (pellet-sinter concentrate having a high iron content and a fineness approximately the same as Grängesberg concentrate GPC), about 32% of another concentrate having a lower iron content, and about 8% slag former, of which 4% was burnt lime, was admixed, for the purpose of forming a suction-sinter charge mixture, with 4% coke dust, 8% limestone and about 23% return sinter (<6 mm). The mixture was moistened to a water content of 7% and rolled in accordance with Example 1 to form a cake, the pores of which were filled with water to about 80% by volume, whereafter the cake was disintegrated by means of a spiked roller according to FIG. 2, and then placed on a sinter grate, without being screened, to form a bed having a height of about 350 mm above the hearth layer, which was 20 mm high.

Sintering was effected in complete accordance with Example 1 above, and required a time of 13.5 minutes (inclusive of the 2 minute standard additional time), there being obtained, after reaching the return balance of about 23%, a production of about 39.5 tons per m$^2$ grate area and 24 hours. The tumbler test as specified in Example 1 gave a result of about 63%.

It will be seen that such a fine concentrate as Malmberget concentrate MPC 3 could only be incorporated in an extremely small quantity, when preparing suction-sinter charges in a conventional manner.

It will readily be seen from the above description and Examples that the present invention provides a novel method and a novel arrangement of apparatus, capable of affording the following advantages:

1. Increased charge permeability, and therewith an increase in production per unit of grate area can be achieved, irrespective of the particle size of the input material.
2. The moisture content of the charge mixture can be held at the low level required for an optimal thermal sequence, thereby saving fuel.
3. When sintering, a small underpressure can be maintained while achieving, at the same time, a high production, thereby reducing the amount of energy required to drive the fans.
4. The charge remains stable and will not compact during a sintering operation.
5. Sintering can be effected without admixing the charge with any other return material than return sinter.
6. A low level of ignition fuel and fuel admixed with the sinter charge can be maintained by employing a large charge-bed height.
7. Extremely fine particulate material, such as dust from steel manufacturing processes, ash from coal combusting processes, etc., can be sintered.
8. When compressing the charge mixture between rolls, only a low roll pressure is required, for example a linear pressure of 150–1000 kp, preferably 200–800 kp, per cm of roll length, thereby greatly reducing the wear on the rolls.

We claim:

1. A method for producing a moist suction-sinter charge of high permeability and stable structure on a mobile suction-sintering grate or in a stationary or mobile suction-sintering pan, which comprises the steps of:
    (a) adjusting the water content of a moist particulate material mixture to be suction sintered so that a minimum of fuel is consumed to maintain the temperatures required for sintering said particulate material mixture;
    (b) compacting said particulate material mixture to form a coherent moist porous cake having a thickness of between about 4 mm to 12 mm, the compaction pressure being adjusted in such a manner that the water present in said mixture will fill the pore volume of said cake to 60–90%, said particulate material being held together mainly by capillary forces; and
    (c) breaking said cake into pieces having a dimension of 20 mm or less to form said suction-sinter charge.

2. A method according to claim 1, comprising classifying said pieces obtained by breaking said cake in a screening apparatus to form a relatively coarse particulate material fraction, which is laid nearest the grate, and a finer particulate material fraction, which is placed on top of the coarse particulate fraction.

3. A method according to claim 2, comprising admixing fine particulate additional fuel with said finer particulate material fraction.

4. A method according to claim 1, comprising compacting said moist particulate material mixture between at least one pair of pressure-loaded rolls.

5. A method according to claim 1, comprising breaking said cake into pieces having a largest size of at most 15 mm.

6. A method according to claim 2, comprising conducting the classifying operation in a manner such that the major part of the material is included in said coarse particulate material fraction.

* * * * *